United States Patent [19]
Ritter

[11] Patent Number: 5,727,062
[45] Date of Patent: Mar. 10, 1998

[54] VARIABLE SIZE BLOCK CIPHERS

[76] Inventor: Terry F. Ritter, 2609 Choctaw Trail, Austin, Tex. 78745

[21] Appl. No.: 499,024

[22] Filed: Jul. 6, 1995

[51] Int. Cl.$^6$ .................... H04L 9/18; H04L 9/00
[52] U.S. Cl. ........................................ 380/37
[58] Field of Search ........................... 380/37, 42

[56] References Cited

U.S. PATENT DOCUMENTS

| | | | |
|---|---|---|---|
| 3,798,359 | 3/1974 | Feistel | 178/22 |
| 3,798,360 | 3/1974 | Feistel | 178/22 |
| 3,962,539 | 6/1976 | Ehrsam et al. | 178/22 |
| 4,078,152 | 3/1978 | Tuckerman | 178/22 |
| 4,157,454 | 6/1979 | Becker | 178/22 |
| 4,275,265 | 6/1981 | Davida et al. | 178/22.09 |
| 4,316,055 | 2/1982 | Feistel | 380/37 |
| 4,751,733 | 6/1988 | Delayaye et al. | 380/42 |
| 4,979,832 | 12/1990 | Ritter | 380/28 |
| 5,003,597 | 3/1991 | Merkle | 380/37 |
| 5,214,703 | 5/1993 | Massey et al. | 380/37 |
| 5,231,662 | 7/1993 | van Rumpt et al. | 380/9 |

OTHER PUBLICATIONS

Gutmann 1974 Excerpt from 400KB Secum File System Documentation.

Moyes, Rubin, Murray, Johnson, Scott, Schneier Messages from Sci. Crypt (Internet Messages from Jan. 1995).

*Primary Examiner*—Thomas H. Tarcza
*Assistant Examiner*—Carmen D. White

[57] ABSTRACT

Data blocks of various size can be processed in fast, effective block cipher mechanisms. Variable size confusion layers and variable size diffusion layers combine to form variable size block ciphers. Block size can set (typically byte-by-byte) at design time or dynamically during operation.

The embodiment of FIG. 1 consists of horizontal layers alternating between confusion and diffusion. Here, each confusion layer, such as the layer including byte-wide substitution operation (16), uses keyed substitution tables which are initialized prior to operation. Simple and fast diffusion layers, such as the layer including byte-wide exclusive-OR (20), generally diffuse in just one direction. Consequently, multiple diffusion layers are usually required, such as those including byte-wide exclusive-OR operations (28) and (36). This kind of diffusion is unusual in a block cipher because it is extremely weak. However, because it can cover the entire block in a single layer, it is unexpectedly advantageous when combined with confusion layers.

The resulting variable size block ciphers are unusually fast and can be made arbitrarily strong. These ciphers can better fit existing applications, reduce overhead, and directly support large and efficient data blocks. Block size can be expanded dynamically, with good overall diffusion, without adding processing layers. These ciphers support better testing and analysis than previous designs, and also support unexpected new techniques for dynamic keying and authentication.

7 Claims, 4 Drawing Sheets

VARIABLE SIZE BLOCK CIPHERS

CROSS-REFERENCE TO RELATED APPLICATIONS

Some variable size block ciphers use the Latin Square Combiner and Extractor or the Balanced Block Mixer of my co-pending application, Ser. No. 08/380,960 Filed 1995 Jan. 30, now U.S. Pat. No. 5,623,549, granted 1997 Apr. 22.

TECHNICAL FIELD

This invention relates to the art of cryptography, the secure transmission or storage of information; more particularly, this invention relates to constructing or enhancing mechanisms for ciphering data in blocks of variable size.

BACKGROUND

A cipher is a way to hide the information in a message when that message may be intercepted. A typical cipher can translate a message into a multitude of different forms, as selected by a key, and then translate any of those forms back into the original, given the same key. Typically, each user has a particular key which specifies an arbitrary but particular intermediate form for their messages. Subsequently, these messages can be exposed by anyone with the same key and cipher, but no one else.

An effective cipher reduces the problem of protecting information to that of enciphering the information and giving keys only to authorized individuals. Controlling key distribution for authorized access is a difficult but well-known issue which is not improved in this application.

Any cipher may be attacked by an opponent in an attempt to gain the hidden information without the use of the correct key. Even though such attacks can be extremely difficult, time-consuming, and costly, many apparently secure designs have been attacked and their protection defeated. Unfortunately, there is no known way to measure the strength of a particular design.

The best-known block cipher is the U.S. Data Encryption Standard or DES, which was adopted as a Federal standard on Nov. 23, 1976. DES is commonly used to protect banking data and other communications, and is often the reference by which other cipher mechanisms are judged.

Since 1976, unprecedented advances in the use of exposed communications (e.g., satellite communications, the Internet, etc.) have increased the need for a secure cipher. But equally unprecedented advances in computational technology now threaten to overwhelm the strength of DES. These advances now make it possible to build a machine which can search all possible DES keys in a reasonable time. Because DES could now be successfully attacked, a new cipher design is needed.

There are many designs for ciphering mechanisms. As one might expect, some may be more secure than others, some are faster than others, while others are perhaps more understandable. Since few if any designs are simultaneously superior in every area, there is a continuing need for ciphers with particular characteristics.

The new ciphering characteristic of variable block size (typically variable in byte-size steps) of this application has many advantages. A variable size block cipher can: be a better match to existing systems; be a better match to inherently variable-size data sources; have improved speed; have the potential for zero data expansion; provide the first practical support for new forms of dynamic keying and authentication; have clarity of construction and simpler analysis; and include the ability to downsize the live cipher for testing.

PRIOR ART

Perhaps the best single source of information on the huge variety of block cipher designs is the book *Applied Cryptography* by Bruce Schneier, published by John Wiley & Sons, Inc. in 1994. But here we discuss the patent record:

Substitution-Permutation Ciphers

U.S. Pat. No. 3,798,359 titled Block Cipher Cryptographic System issued 1974 Mar. 10 to Horst Feistel (IBM) gives a detailed design which has a substitution-permutation structure. (claim 1 has: "means for carrying out a plurality of substitution operations" and "means for rearranging the combination of binary representations in said block.") Here, "rearrangement" means "permutation." In contrast, the present application uses variable size diffusion layers instead of the permutation layer of the '359 patent. Because of the fixed nature of the permutation (FIG. 5B of that patent), the '359 patent cannot accommodate the variable size blocks of the present application.

U.S. Pat. No. 4,275,265 titled Complete Substitution Permutation Enciphering and Deciphering Circuit issued 1981 Jun. 23 to George Davida and John Kam teaches another form of substitution-permutation ciphering. This design (FIG. 1 of that patent) uses three substitution layers, and the interconnections between these layers are the permutation connections. The "substitution boxes" in the '265 patent are not general substitution tables containing keyed arbitrary permutations of the possible values, but instead are just two fixed mappings (FIG. 2 of that patent). In each box, three data bits and one key bit are input, but and only three result bits are produced; the key bit selects between two particular ("complete") pre-defined three-bit-wide mappings. In contrast, the present application uses full substitution tables which are shuffled or keyed in arbitrary (instead of particular) arrangements. Moreover, the particular permutation structure in the '265 patent (the connections between layers of FIG. 1 of that patent) cannot handle blocks of different size without significant changes. Thus, the approach of the '265 patent cannot handle the variable size blocks of the present application.

U.S. Pat. No. 4,751,733 titled Substitution Permutation Enciphering Device issued 1988 Jun. 14 to Bernard Delayaye et. al. (Thomson-CSF) describes a classic substitution-permutation cipher. Although it does use byte-width substitutions, the rigid structure of the bit-permutation connections (FIG. 5 of that patent) make it unsuitable for processing the variable size blocks of the present application.

U.S. Pat. No. 5,231,662 titled Method and Device for Enciphering Data to be Transferred and for Deciphering the Enciphered Data, and a Computer System Comprising Such a Device issued 1993 Jul. 27 to Herman van Rumpt and Benny Kwan (Tulip Computers International) teaches yet another form of substitution-permutation cipher. The Summary (col. 2 of that patent) teaches that one goal of this approach is to provide a cipher whose block width is equal to the width of the data bus in a general purpose computing machine. While that patent claims encipherment for data words of "n" bits, claim 1 (col. 6, line 60) clearly states that n is a "pre-defined integer." Thus, the approach of the '662 patent cannot handle the variable size blocks of the present application.

U.S. Pat. No. 4,157,454 titled Method and System for Machine Enciphering and Deciphering issued 1979 Jun. 5 to Wolfram Becker (IBM) teaches the ciphering of variable length data fields (Summary, col. 2, line 44 of that patent) in a substitution-permutation cipher. Nevertheless, the approach of the '474 patent cannot be said to handle the variable size blocks as defined in the present application:

Simple forms of permutation, such as the rotation suggested in the '474 patent (col. 4, lines 20–21), distribute bits slowly. For example, if we rotate a data block (by any number of bits which is not a multiple of the element size), each previous element can place bits in (and thus diffuse into) two adjacent subsequent elements. But by further rotating that block in the next round, the best we can do with now two adjacent elements is to place bits in three subsequent adjacent elements, not four. This implies a need for n execution rounds for a block of n elements for even the most basic diffusion. This need to vary the number of rounds to achieve the overall diffusion required in a block cipher does not qualify the approach in the '474 patent as a variable size block cipher as defined in the present application.

In contrast, in tests with 200-byte blocks, the examples of the present application provide overall diffusion in just 3 layers. For a similar 200-byte block, the design of the '474 patent would seem to require 199 block rotations and substitutions. This is a dramatic practical difference.

It is worthwhile to point out that substitution-permutation ciphers inherently need multiple rounds to achieve overall diffusion, and inherently the number of rounds must vary with block size: Clearly, each substitution operation does diffuse bits, but only within the substituted element. And each permutation operation does diffuse bits, but only between distinct elements (this is a bit re-distribution). So the result of any one substitution can at most affect as many elements as there are bits in an element. This means that the permutation approach simply cannot diffuse larger blocks without additional rounds. In marked contrast, the diffusion layers of the present invention allow each substitution result to affect arbitrarily many subsequent substitutions (in one linear direction) in a single diffusion layer.

If we seek to increase block size in conventional substitution-permutation ciphers, we must find permutations which evenly distribute bits for each size block we support. Unless we also increase the element size, more rounds are required to maintain the overall diffusion demanded in a block cipher. And if we increase the element size, we have to handle substantial increases in the size of all substitution tables. These facts constrain most substitution-permutation ciphers to a fixed design size and number of rounds.

In contrast, the variable size diffusion layers of the present invention can diffuse information across an entire block (typically, one direction at a time) in just one layer. Just two such layers typically will diffuse any bit to any other bit. Just three such layers can produce good overall diffusion which is essentially independent of block width. Other diffusion layers may be used to further improve diffusion and add strength.

Feistel Ciphers

U.S. Pat. No. 3,962,539 titled Product Block Cipher System for Data Security issued 1976 Jun. 8 to William Ehsam et. al. (IBM) appears (FIG. 8 of that patent) to use what is now known as the conventional Feistel architecture like that used in DES. This approach uses fixed substitution tables, instead of the keyed or shuffled tables of the present application. Moreover, the fundamental Feistel architecture of the '539 patent works only with some fixed ratio between internal element size and block size. (In both '539 FIG. 8 and DES the internal elements are half-blocks.) Thus the approach of the '539 patent cannot handle the variable size blocks of the present application.

U.S. Pat. No. 5,003,597 titled Method and Apparatus for Data Encryption issued 1991 Mar. 26 to Ralph Merkle (Xerox) describes a round-oriented Feistel cipher variant. The patent does teach keyed or shuffled substitutions as used in the present application. The patent also teaches keying by combining an "Aux Key" with the data across the width of the block, which is also a dynamic keying option in the present application. But the '597 patent is claimed for fixed 64-bit data blocks, thus making it unsuitable for processing the variable size blocks of the present application.

All Feistel ciphers can at best handle blocks which are some small integer multiple of a power-of-two. Typically, Feistel ciphers such as DES use two sub-blocks of half size each. This architecture is fundamentally unsuitable for processing the variable size blocks of the present application.

Modes Of Operation

U.S. Pat. No. 3,798,360 titled Step Code Ciphering System issued 1974 Mar. 19 to Horst Feistel (IBM) appears to cover what we would now call a "mode of operation" in that it uses an internal block cipher (22 in FIG. 1 of that patent). The '360 patent does state (col. 3, lines 20–22) "the principles of this invention are not limited to any particular data feed register size." But it also says (col. 3, lines 11–14) "At some point in time, when sufficient data is accumulated in the data block of proper dimension for enciphering," clearly implying that there is some "proper dimension." Thus, the '360 patent apparently does not handle the variable size block ciphers of the present application.

U.S. Pat. No. 4,078,152 titled Block-Cipher Cryptographic System with Chaining issued 1978 Mar. 7 to Bryant Tuckerman (IBM) again does not cover a cipher per se, but instead covers the well-known chaining mode of operation for use with any existing block cipher (such as DES). One purpose of this (col. 3, lines 29–33 of that patent) is to avoid the natural consequence of a block cipher, where identical input blocks will produce identical ciphertext. This produces a one-way diffusion in the same sense as a stream cipher, but not as a layer in a block cipher, not in combination with a confusion layer, and makes no pretense of providing or intending to provide overall diffusion. A chaining mode is not a block cipher in the sense of the present application, and the '152 patent does not handle the variable size block ciphers of the present application.

Others

U.S. Pat. No. 5,214,703 titled Device for the Conversion of a Digital Block and Use of Same issued 1993 May 25 to James Massey and Xuejia Lai (Ascom Tech AG) teaches the well-known IDEA cipher. This is a structure inherently limited to blocks of 64 bits or less ("m=4, 8, or 16" in col. 4 line 69 of that patent) by the combining operation of multiplication mod $2^m+1$. Since $2^{16}+1$ (and $2^8+1$ and $2^4+1$) is prime, it can creates a mathematical field, but $2^{32}+1$ is not prime, so the same approach does not scale up. Thus, the '703 patent does not handle the variable size block ciphers of the present application.

No Literature On Variable Size Block Ciphers

As far as is known, the literature contains no examples or discussion of the variable size block ciphers of the present application. There is also no known discussion of the advantages of such a cipher.

There are many stream ciphers, which do handle variable amounts of data, but do not provide overall diffusion. In a block cipher, if we change any single bit of the input data, we expect to see about half of the output bits change.

There are also many block ciphers, which do provide overall diffusion, but conventional block ciphers always have some particular fixed block size. It is very difficult to change the block size in conventional designs to end up with a good larger cipher, whether the motive be convenience, performance, or strength.

Because of the obvious advantages inherent in a variable size block cipher, the lack of such implementations in the literature indicates that variable size block cipher design is clearly unobvious.

Casual Comments On Improving Stream Ciphers

There have been Internet comments in the Usenet News sci.crypt group which suggest using a stream cipher first forward, then backward, to improve its diffusion. Other comments suggest a carry of accumulated information from the first pass to the second pass.

My experiments with the fast and weak variable size layers described in this application indicate that not one but two subsequent passes are generally needed to approach the overall diffusion requirements of a block cipher. This finding may or may not apply to stream ciphers in general.

No Literature On Variable Size Layers

All ciphers are made from smaller components, and many block ciphers have operations in layers of some form or other, but it is unusual to find a block cipher design in which each layer can be easily extended (in element-size steps) to arbitrary size.

The variable size block ciphers of this application typically use two types of layer, which I call confusion and diffusion. A confusion layer might consist of an array of substitution elements, each of which might be unique (for example, shuffled under the control of a key). A substitution layer of some sort is an integral part of well-known substitution-permutation architectures, but these are not variable size block ciphers.

A diffusion layer would be some sort of mixing layer which would propagate changes across the block. Such a layer would be useless within the context of a substitution-permutation design, making this clearly contrary to the prior art. Fast and simple diffusion layers do tend to propagate in only one direction, so multiple such layers are usually needed.

Some layers perform both confusion and diffusion. But because there is no literature on variable size block ciphers, there is also no literature on the variable size layers needed to build such ciphers.

No Literature On Dedicated Diffusion Layers

The variable size diffusion layers of this application are particularly intended to provide diffusion without necessarily providing cryptographic strength. These are layers which are normally considered too weak to use in the context of cryptography, and so would be unexpected in conventional block cipher design. Again, this is contrary to prior art.

In contrast, conventional Feistel designs like DES apparently depend upon the uncertain diffusion effects of a random function. The variable size block cipher technology of this application provides improved diffusion, in fewer layers, and an overall more efficient cipher than previous technologies.

No Known Literature On Effective Block Ciphers With Few Rounds

The variable size block technology of this application produces good overall diffusion in fewer rounds than conventional Feistel block cipher designs like DES. The variable size diffusion layers of this application are guaranteed to affect even the most distant byte of the block (in one direction at a time). In contrast, Feistel block cipher designs apparently rely on the uncertain diffusion effects of a random function which affects at most a full sub-block at once. Substitution-permutation designs are limited to re-distributing the limited number of bits in each element to each other element, and so cannot diffuse a large block quickly.

If we consider a variable size block cipher "round" to be a confusion layer and a diffusion layer, the technology of this application produces good overall diffusion in 4.5 rounds. In contrast, the technology used in DES apparently requires 8 rounds for similar diffusion (Schneier p. 237). Both technologies may require some additional processing for strength, but only the variable size block ciphers of this patent can handle large blocks without additional layers or rounds.

No Literature On Use Of New Combiners In Block Ciphers

It is unique to find a block cipher which uses Latin squares, Balanced Block Mixers, or Dynamic Substitution.

Dynamic Substitution is the topic of U.S. Pat. No. 4,979,832 issued 25 Dec. 1990 titled Dynamic Substitution Combiner and Extractor.

Balanced Block Mixers are a topic in co-pending application Ser. No. 08/380,960 filed 1995 Jan. 30 titled Cipher Mechanisms with Mixing and Balanced Block Mixers.

Latin Square Mixing is another topic in co-pending application Ser. No. 08/380,960 filed 1995 Jan. 30 titled Cipher Mechanisms with Mixing and Balanced Block Mixers.

Literature Reports Difficulty In Doubling Fixed Block Size

Schneier reports (pp. 255–256) a proposal to double the block size of the IDEA cipher from 64 bits to 128 bits. However, the IDEA cipher depends upon a combining operation of a specific size (16 bits, using the field based on the prime $2^{16}+1$, and $2^{32}+1$ is not prime). As is the usual case with a conventional block cipher, even doubling the size of the block is difficult, let alone supporting byte-by-byte expansion.

OBJECTS AND ADVANTAGES

Objects

One objective of this invention is to provide constructions for practical, efficient, and effective block ciphers which handle data blocks of various size. It is a further objective to provide block cipher constructions which are easier to analyze than conventional ciphers. Yet another objective is to provide block cipher constructions which will support new approaches in dynamic keying and authentication, as well as other features which can only be practical within the context of a variable size block cipher.

Fundamental Speed Advantage

Ciphering is an overhead cost to communications, and so can never occur fast enough. The ciphers of the present application are based on constructions which produce effective ciphers out of relatively few particularly fast and simple layers. This unusual construction is faster than other techniques; in this sense it succeeds where others have failed.

Fundamental Strength Advantage

Variable size block cipher designs typically make heavy use of keyed substitution tables. The byte-width tables used in the examples of this application are much larger and more complex than the simple fixed tables used in DES. Nevertheless, these larger tables are well within the range of modern resources, and are not unknown in the prior art.

In these variable size block cipher examples, each table will be initialized by shuffling under the control of a key.

Since there are 256 factorial (256×255×. . . ×2) possible shufflings of a byte-width table, we can reasonably expect that each table in a real system will differ. In contrast, DES uses the same known tables all the time.

When we increase the block size in a variable size block cipher, we typically increase the number of substitution operations; this makes the cipher transformation more complex, even when tables are re-used. We also have the option of using more tables, which will further increase the complexity of the transformation. All things being equal, a larger layer and more tables must inherently make a stronger cipher.

Conventional block ciphers are often designed with "rounds," which repeat a certain core of operations a suggested number of times. Additional rounds can be used in these ciphers. But even the additional rounds still perform the same operations as earlier rounds, and if they use tables, they use the same tables, so it is not at all clear that more rounds necessarily make a stronger cipher. In contrast, added layers in the style of this invention could and should include new substitution tables or a different ordering, and so can be expected to add new strength.

If we equate a layer each of confusion and diffusion in a variable size block cipher with a round in a conventional cipher, the variable size block cipher needs fewer rounds (4.5 versus 8). In this sense, the variable size block cipher succeeds where others have failed.

Better Fit To Existing Systems

Some existing digital systems may have unusual block sizes which a variable size block cipher could better service. In some cases, a designer could choose to accumulate or buffer data until there is enough to encipher as a conventional block. But this buffering could contribute to excessive overall delay, especially with respect to "bursty" data. For example, if only a partial block remains and there is no more data to send, the buffering logic may wait until more data become available before the last data are sent. Presumably, additional complexity could solve this problem, but it might be better to simply avoid the entire issue with variable size block technology.

Buffering is also an overhead operation which must inevitably reduce processing speed in a general-purpose computer realization. The problem of matching a cipher to existing or optimal data block sizes so as to better fit a particular application is a problem with which the literature does not seem particularly concerned.

The speed and other advantages of a variable size block cipher could be advantageous even when used with the fixed-size 64-bit data blocks used by DES and other block ciphers.

Better Fit To Inherently Variable-Size Devices

Modern voice ciphers use a "codec" (COder, DECoder) to convert voice to a digital stream of data. Such a device probably would not produce exactly the block size desired by a conventional block cipher and might ideally produce variable-size data blocks, making a variable size block cipher the best match.

A variable size block cipher would also be a better fit to cipher a database containing fields of various size. Some fields might even be of variable size, again making a variable size block cipher an ideal match, and a fixed-size block cipher a problem.

Speed Advantage From Large Blocks

Where the number of blocks can be reduced by using larger blocks, the total amount of per-block overhead may be reduced from that of a fixed size block cipher.

Strength Advantage From Large Blocks

Block size plays a pivotal role in block cipher strength. For example, an 8-bit substitution table (with 256 entries) might be described as a sort of block cipher, but would be weak as soon as any table entry was used more than once.

Block ciphers attempt to emulate a substitution table of huge size, so that ciphering transformations are very rarely re-used. But a large block can contain more characters, with larger amounts of language, having more variability and even less likelihood of repeating. Thus, the simple ability to cipher large blocks can mean a stronger cipher.

Supports Forms Of Dynamic Keying

Another way to dynamically key a variable size block cipher is to simply add a layer which in some way combines a key value with the data. For example, a layer of byte-wide exclusive-OR operations could combine the data block with a data-size key. This is not unknown in the prior art. But to the extent that dynamic keying is important in convincing designers that the variable size block ciphers of this application are practical, this is another way to accomplish dynamic keying.

To support variable size blocks, the keying layer could combine data with values from a very simple and fast random number generator—very like a simple stream cipher. With respect to the overall block cipher, a keying layer could be a confusion layer or perhaps a combined confusion and diffusion layer.

Inherently Supports Testable Small Versions

A variable size block cipher can be tested with a small block size, and then exactly the same program or exactly the same hardware (with only a different block size value) used as the production cipher. The advantage here is the ability to test not just a simplified experimental package (which may not contain an error present in the larger cipher), or even a small prototype version, but the actual live cipher itself.

The ability to test the same cipher using small blocks may make it possible to exhaustively test all aspects of that version. This information can be used to refine the design, and extrapolate and estimate the complexity of the large version, which will be far too large to exhaustively test. This solves a problem with construction validation which has apparently never before been recognized or solved in the literature.

Inherently Supports Easier Analysis

The fundamental structure of the variable size block cipher examples in this application all use mathematically-simple yet substantial operations. These operations can be described mathematically, and can be well understood.

For example, all of the substitution tables in these variable size block ciphers are just different arrangements or permutations of the same values. Among other things, this means that we can guarantee that any input change must select a different output value, and thus produce an output change. More general confusion functions, such as those supported in Feistel architectures, do not have this property and do not support this sort of reasoning.

Similarly, the use of layers which provide diffusion across the width of the block in the variable size block ciphers of this application simplifies diffusion questions compared to other ciphers. For example, most conventional Feistel designs apparently find the number of rounds needed to for complete diffusion by experiment. In the variable size block cipher examples given here, we can do the same sort of experiments, but also can reason about the effect of each separate layer, and there are relatively few layers to analyze.

Since there is no way to measure or guarantee the strength of any practical cipher, any improvement in the ability to reason about the mechanism is a big advantage.

Need Not Expand Data At All

The usual implication of collecting variable-length data into fixed-size blocks is that the last block will only be partially filled, but must nevertheless be fully enciphered. This means that a fixed size block cipher generally must be allowed to expand the data by almost a full block during ciphering. Expanded data means taking more storage space and transmission time than would otherwise be needed. A true variable size block cipher at least has a possibility of avoiding any data expansion at all.

Further objects and advantages of my invention will become apparent from a consideration of the drawings and ensuing description.

SUMMARY OF THE INVENTION

The present invention uses simple invertible diffusion and confusion layers (or combined layers) to produce a variable size block cipher. Since each of the layers is separately invertible, the cipher itself is invertible, so that enciphered data may be deciphered. Deciphering occurs by producing the inverse of each layer and processing each layer in reverse order from that used in enciphering.

Layers

The layers in the present invention are special in that they use simple operations which operate on small units of data or data elements (for example, bytes). Such layers support extreme speed in processing and are easily realized in hardware or a general purpose computing machine.

Each confusion layer of the present invention is not too different from a weak stream cipher. But because the diffusion layers have no strength, they would be very unusual as a stream cipher. It is only when these layers are used in combination that they unexpectedly provide the overall diffusion and strength needed in a block cipher.

Arbitrary Size

Layers based on small operations are easy to extend to virtually arbitrary size (in steps of the operation size). And if all the layers in the cipher are easily extended, the cipher itself can handle data blocks of arbitrary size (typically in byte-size steps). This yields a variable size block cipher with advantages not available in fixed-size designs.

Some of the advantages of variable size block ciphers include: higher speed, a better fit to existing systems, support for testable small versions, and easier analysis. Moreover, a variable size block cipher unexpectedly supports exciting new methods of dynamic keying and authentication.

Keying

The confusion layers provide primary keying. In a typical confusion layer, each element of the data block is transformed by an associated substitution operation. In a layer of byte-wide invertible substitutions, each table can differ only in the ordering of the values in the table, but there are 256 factorial such orderings. Selecting among all possible table orderings would seem to require a big key, but we can support this by using a key of reasonable size to initialize the state of a random number generator. The sequence of values from the random number generator mechanism can then be used to shuffle all of the tables in the cipher. Both the design of random number generators and their use to shuffle invertible substitutions are well known and are not improved in this application.

Some dynamic keying may be provided by diffusion-layer inputs (these are the start of the diffusion channels on one or the other side of the block). More dynamic keying can be added by including a keying layer in the cipher. This layer would simply combine a key of the block width with the data. Combining could be additive, Latin square, or other cryptographic combining. A key of any effective width can be provided by a keyed random number generator.

Additional dynamic keying can be provided by including a key as part of the data block. This would produce more ciphertext than message (enciphering would appear to expand the data), but the resulting key would be reproduced by deciphering, and could be used to authenticate the original data. Since, in a variable size block cipher, the data block can be as large as desired, even an 80-bit dynamic key could be a minor overhead. And it might well provide an authentication which may be necessary anyway.

Overall Diffusion

Appropriate diffusion layers have been found which support the overall diffusion characteristic needed in a block cipher. The diffusion available in a single fast and simple layer is typically one-way. That is, any change in input value is propagated across the block in just one direction. Accordingly, it is often necessary to use multiple diffusion layers to achieve the overall diffusion required in a block cipher.

Overall diffusion can be produced by having separate layers diffusing in opposite directions. Alternately, overall diffusion can be produced by layers diffusing in the same direction, provided the carry output from an early layer is communicated to the initial value input of one or more later layers. The latter approach would have to be taken carefully, however, since it could circumvent the isolation of intermediate confusion layers, and might be a weakness which could be attacked.

The overall diffusion characteristics for a block cipher are relatively easy to check by experiment: For a random key we choose a random data block and encipher it. Then we change a bit in the original block, encipher that, and compare the result to the original ciphertext, counting the number of bits which changed. We do this for a large number of random blocks and a large number of keys, producing a distribution which is the number of occurrences of each possible number of bit-changes. We know what to expect because the probability of finding any particular number of bit changes c in a block of b bits is:

$$\text{Prob}(c) = \frac{\binom{b}{c}}{2^b}$$

With a reasonable number of experiments (e.g., 160,000 encipherings of 200-byte blocks) large blocks produce an especially clear and distinct avalanche signature. This is because large blocks have a relatively small range of values for expected bit changes c, and even a huge number of experiments should produce few unexpected values. Overall diffusion tests of the preferred embodiment examples in FIGS. 1 through 4 have shown particularly good results, sometimes surprisingly better than very similar architectures.

DESCRIPTION OF THE PRESENTLY PREFERRED EXEMPLARY EMBODIMENTS

FIGS. 1 through 4 show 80-bit block cipher designs. The 80-bit block was chosen as being larger than the 64-bit block of DES, and not a power-of-2 size (as many ciphering architectures must be). Since each design uses exactly the same block size, their effectiveness can be compared directly.

FIGS. 1 through 4 illustrate ciphers composed of horizontal rows or layers of similar components, and vertical columns which often contain different component types. The heart of each cipher is the vertical column composed only of operations which are one element in width. In these particular designs, each element is one byte wide; this means that all operations are byte-width operations, and all internal data paths are eight bits wide.

Each column in any one of these ciphers contains the same connections and operations. The columns differ only in the particular adjacent columns (if any) to which their data and diffusion inputs and outputs are connected. Each cipher can be extended to arbitrary size by adding more columns. We choose to discuss the leftmost column only, without loss of generality, since the structure of each column is the same except for the connections which transport data beyond that column.

Since diffusion is necessary across the width of the block, each column communicates with adjacent columns. This means that the leftmost and rightmost columns will produce diffusion carry outputs (which can be ignored) and will require external input values.

FIGS. 1 through 4 are data-flow diagrams. That is, the figures represent the flow of data from some source through a data path to an operation, the operation itself, and the flow of the result through another data path to some data sink or user of the result value. In a hardware realization, a data path might be actual metallic connections. In a general-purpose computer realization, a data path might simply represent the movement of data from one operation to another.

In practice, processing might occur sequentially, especially in a general-purpose computer. In this case, each layer might be processed separately, one element at a time. Depending on the particular implementation involved, it could be more efficient to combine several layers into a single pass across the block, and other layers into another pass, generally in the opposite direction.

FIGS. 1 through 4 illustrate practical ciphers using 10 element positions or columns of 8-bit operations. Since similar operations are used in each element position, it is clear that element positions could be replicated as necessary to produce any reasonable block size. Most of these designs have been tested both with 80-bit (10-byte) and 1600-bit (200-byte) blocks.

Figure 1:
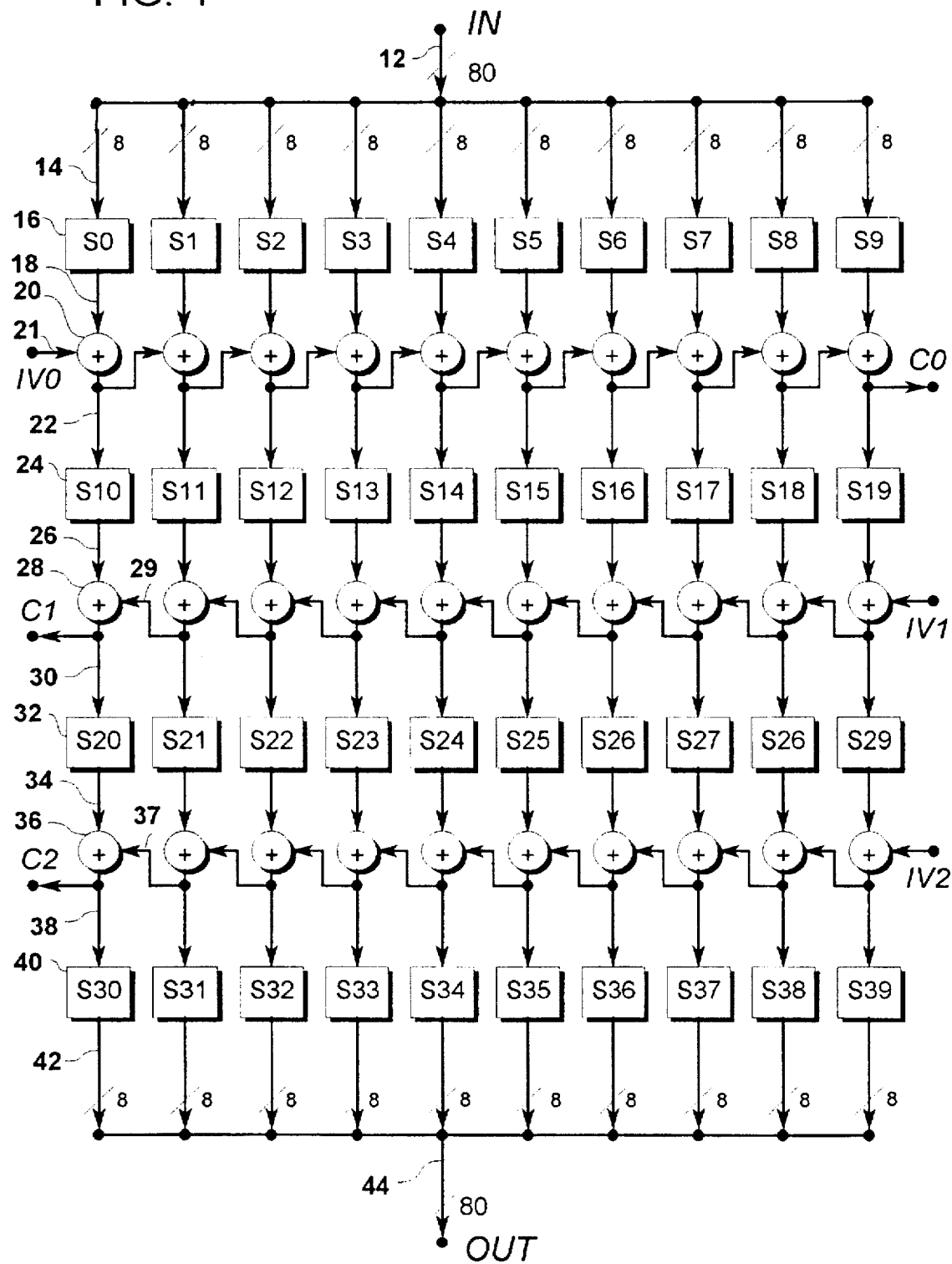
FIG. 1 is a data-flow diagram of a fast and effective 80-bit block cipher which uses keyed byte-wide substitution operations for confusion and byte-wide exclusive-OR operations for diffusion.

FIG. 1—Simple Exclusive-OR Diffusion

FIG. 1 is an example of an 80-bit block cipher built solely from variable size layers. This makes the cipher easily extendible (in byte-by-byte steps) to arbitrary size, either at design-time, or dynamically during operation.

An 80-bit input block is conducted into the cipher mechanism by block-wide data path 12. Block-wide data path 12 is split into multiple data paths each of element size, including byte-wide data path 14. In the specific example of FIG. 1, the element size is a byte. Data path 14 conducts data to byte-wide substitution operation 16 which returns a value to byte-wide data path 18.

Data path 18 conducts its data to byte-wide exclusive-OR operation 20. Exclusive-OR 20 additively combines the data from data path 18 and byte-wide data path 21 from external value IV0 and returns the result to data path 22. Data path 21 carries right-going diffusion from the left-adjacent column; in the leftmost column this is byte value IV0 (Initial Value 0) from outside the cipher. Data path 22 continues the right-going diffusion to the right-adjacent column; in the rightmost column this is reported out of the cipher as byte value C0. The carry outputs and IV inputs illustrate that columns could easily be added to either side of the existing design.

Data path 22 also conducts its data to byte-wide substitution operation 24, which returns a value to byte-wide data path 26. Substitutions 16 and 24 and all the other substitutions in the cipher represent separate data processing operations, but are not necessarily different tables. The actual table used at any particular substitution position might be chosen from many such tables, depending upon element position, layer, some data value, or a combination of these.

Data path 26 conducts its data to byte-wide exclusive-OR operation 28. Exclusive-OR 28 additively combines the data from data path 26 and byte-wide data path 29, and returns the result to byte-wide data path 30. Data path 29 carries left-going diffusion from the right-adjacent column; in the rightmost column this is byte value IV1 from outside the cipher. Data path 30 continues the left-going diffusion to the left-adjacent column; in the leftmost column this carry is reported out of the cipher as byte value C1.

Data path 30 conducts data to byte-wide substitution table 32, which returns a result to data path 34, which conducts its data to byte-wide exclusive-OR 36. Exclusive-OR 36 additively combines the data from data path 34 and byte-wide data path 37, and returns the result to byte-wide data path 38. Data path 37 carries left-going diffusion from the right-adjacent column; in the rightmost column this is byte value IV2 from outside the cipher. Data path 38 continues the left-going diffusion to the left-adjacent column; in the leftmost column, this is reported out of the cipher as byte value C2. Data path 38 also conducts its value to byte-wide substitution table 40, which returns a result to data path 42. Data path 42 is simply collected along with the results from the other columns, to form block-wide data path 44, which conducts the result out of the cipher mechanism.

Figure 2:
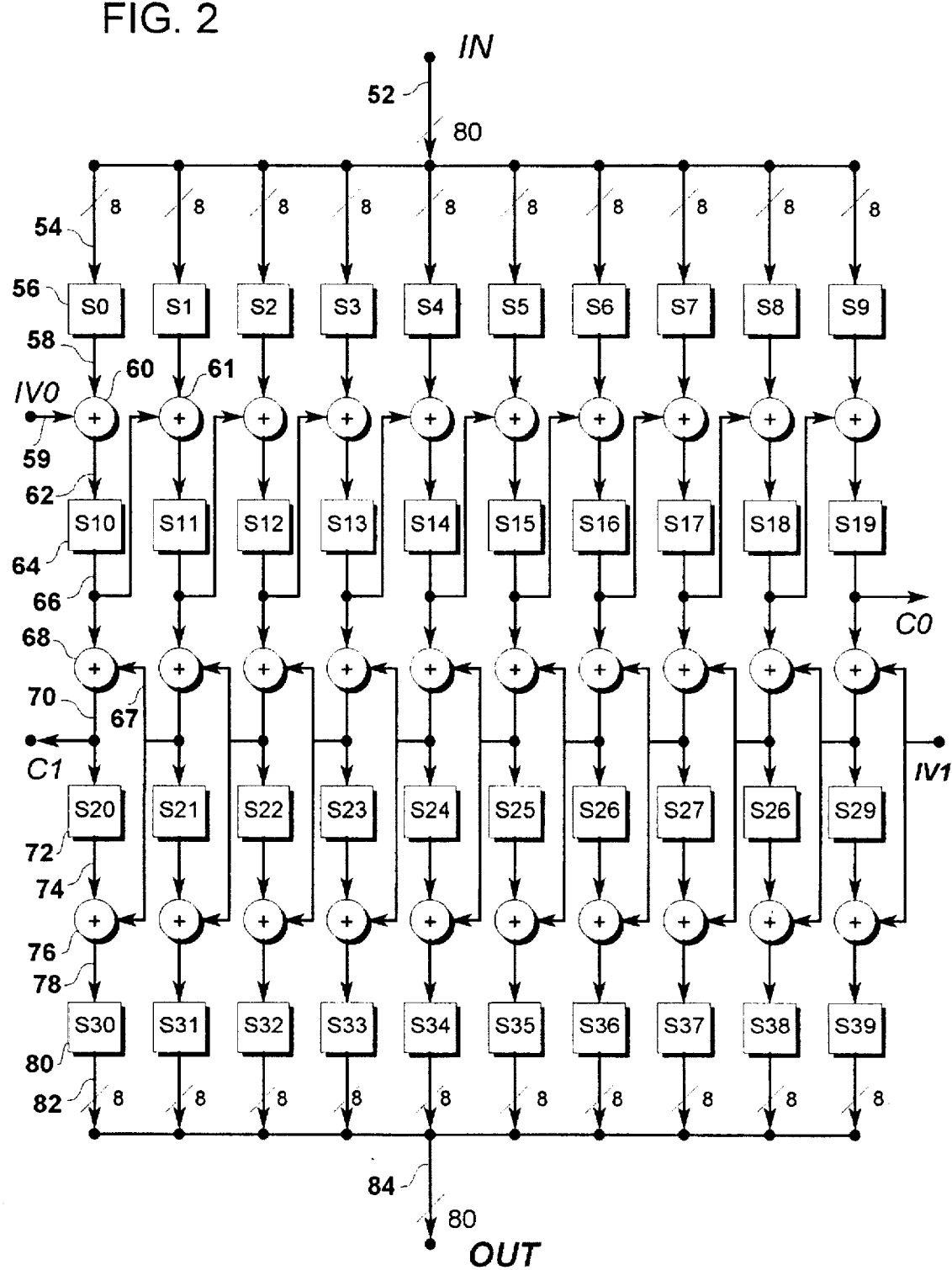
FIG. 2 is a data-flow diagram of an 80-bit block cipher similar to FIG. 1, but with improved diffusion and strength.

FIG. 2—Diffusion Across Layers

The 80-bit block cipher example of FIG. 2 is much like the similar structure of FIG. 1, with improvements in diffusion. Like FIG. 1, FIG. 2 includes, in alternation, four layers of substitution operations and three layers of exclusive-OR operations. Like all of these variable size block cipher designs, the structure of each column is the same, although the actual substitution tables used will vary.

Unlike FIG. 1, some of the diffusion paths used in FIG. 2 include intermediate substitutions using substitutions already in place. Clearly, it would be possible to introduce new substitution operations between each exclusive-OR in the diffusion paths, but much of the benefit of such a structure is achieved here without added computation.

An external data block is conducted to the cipher mechanism of FIG. 2 through block-wide data path 52. Eight bits of block 52 are conducted by byte-wide data path 54 to byte-wide substitution operation 56. Substitution 56 produces a result on byte-wide data path 58, which conducts that value to byte-wide exclusive-OR operation 60. Exclusive-OR 60 additively combines the value on data path 58 with the value on byte-wide data path 59, and produces a result on byte-wide data path 62. Data path 59 carries right-going diffusion from the left-adjacent column; in the leftmost column, this is byte value IV0 (initial Value 0) from outside the cipher. Data path 62 conducts the combined value to byte-wide substitution operation 64, which produces a result on byte-wide data path 66. Data path 66 continues the right-going diffusion to the right-adjacent column; in the rightmost column this is reported out of the cipher as byte value C0 (carry 0). The carry outputs and IV inputs illustrate that columns could easily be added to either side of the existing design.

The value on data path 66 is conducted to byte-wide exclusive-OR operation 68, which additively combines the value on data path 66 with the value on byte-wide data path 67 and produces a result on byte-wide data path 70. Data path 67 carries left-going diffusion from the right-adjacent column; in this rightmost column this is byte value IV1 from outside the cipher. Data path 70 continues left-going diffusion to the left-adjacent column; in the leftmost column this is reported out of the block as byte value C1. Data path 70 also conducts its value to byte-wide substitution operation 72, which produces a result on byte-wide data path 74. Data path 74 conducts its value to byte-wide exclusive-OR operation 76, which additively combines the value from data path 74 and byte-wide data path 67 and produces a result on byte-wide data path 78. Data path 67 carries left-going diffusion from the right-adjacent column. Data path 78 conducts its value to byte-wide substitution 80, which produces a result on byte-wide data path 82. Data path 82 is simply collected with the other byte-wide data paths in the same layer, producing block-wide data path 84 which conducts the final result out of the cipher.

Figure 3:
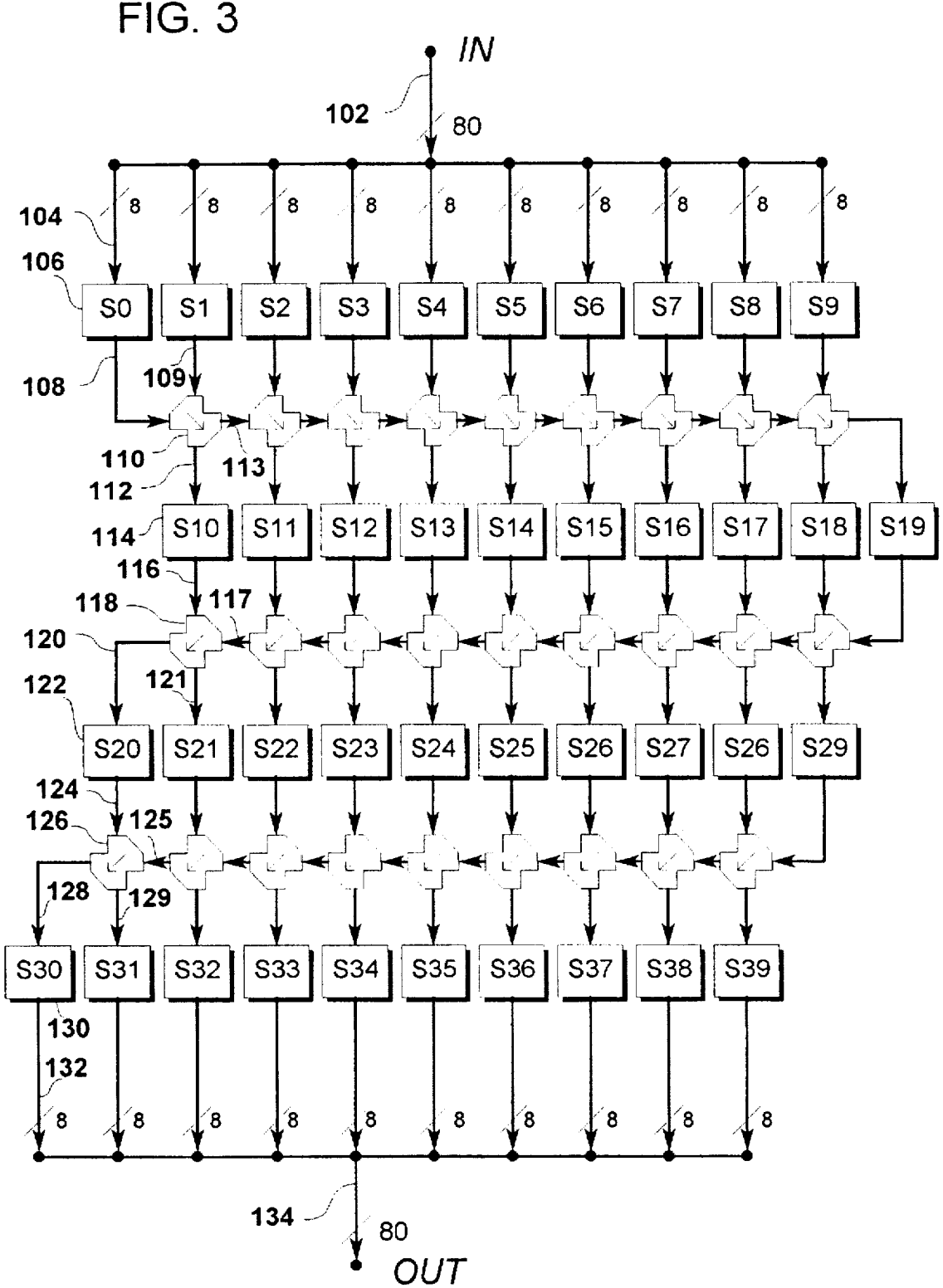
FIG. 3 is a data-flow diagram of an 80-bit block cipher which uses byte-wide Balanced Block Mixer operations for diffusion.

FIG. 3—Balanced Block Mixing For Diffusion

The example 80-bit block cipher of FIG. 3 exploits the reversible two-port nature of Balanced Block Mixing to provide somewhat better diffusion than exclusive-OR, and to avoid the need for external Initial Values.

Because the structure of the mixing component differs from the exclusive-OR used in FIG. 1 and FIG. 2, the diffusion architecture of FIG. 3 is accordingly different. In particular, there is always one less Balanced Block Mixing in the diffusion layers than there are element-wide data paths and substitution elements in the confusion layers. We can think of the Balanced Block Mixing as fitting in the space between adjacent confusion columns.

Again, it would be possible to introduce new substitution operations in the diffusion paths between Balanced Block Mixings, with consequent additional computational overhead.

An external data block is conducted into the cipher on block-wide data path 102 and eight bits of that block are conducted by byte-wide data path 104 to byte-wide substitution operation 106. Substitution 106 produces a result on byte-wide data path 108 which is conducted to one of the input ports of byte-wide Balanced Block Mixer 110. Mixer 110 combines the values on data path 108 with the value on byte-wide data path 109 and produces result values on byte-wide data paths 112 and 113. Data path 109 carries the confusion value from top confusion layer in the right-adjacent column. Data path 113 carries right-going diffusion to the right-adjacent mixer or, in the rightmost column, the rightmost confusion element of the next confusion layer. Data path 112 carries its value to byte-wide substitution operation 114, which produces a result on byte-wide data path 116 which conducts that value to one input port of Balanced Block Mixer 118. Mixer 118 combines the value on data path 116 and byte-wide data path 117 and produces result values on byte-wide data paths 120 and 121. Data path 117 carries left-going diffusion from the right-adjacent mixer; in the leftmost column this is data path 120 and is connected to the leftmost confusion element of the next confusion layer. Data path 121 carries diffusion to the substitution which corresponds to substitution 122 in the right-adjacent column. Data path 120 carries its value to byte-wide substitution operation 122, which produces a result on byte-wide data path 124 which is conducted to one input port of Balanced Block Mixer 126. Mixer 126 combines the value on data path 124 with the value on byte-wide data path 125, and produces result values on byte-wide data paths 128 and 129. Data path 125 carries left-going diffusion from the right-adjacent mixer. In the rightmost column, the data path corresponding to path 125 comes from the rightmost element of the previous confusion layer. In the leftmost column, the data path corresponding to path 125 is connected to the leftmost confusion element of the next confusion layer. Data path 129 carries diffusion to the substitution which corresponds to substitution 130 in the right-adjacent column. Data path 128 carries its value to byte-wide substitution operation 130, which produces a result on byte-wide data path 132. Data path 132 is collected with the result values from the other substitutions in the same layer as substitution 130 into block-wide data path 134. Data path 134 then conducts the result out of the cipher for external use.

Figure 4:
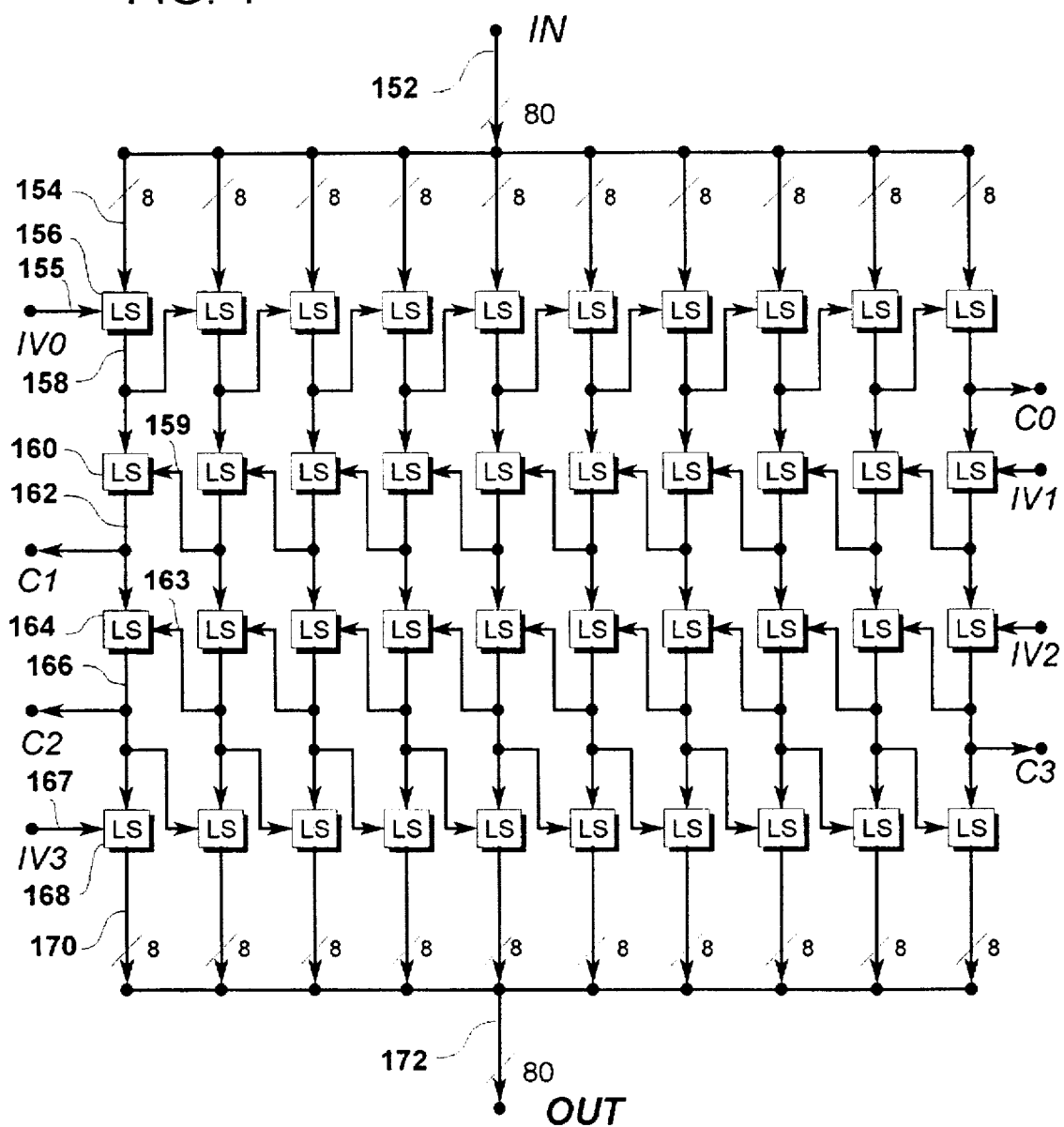
FIG. 4 is a data flow diagram of an 80-bit block cipher which uses Latin square combining operations for simultaneous confusion and diffusion.

FIG. 4—Latin Square Combined Confusion And Diffusion

The 80-bit block cipher of FIG. 4 is unique in that, of the four examples, it creates a cipher from a single component type. That component type is the Latin square combiner, which simultaneously provides both confusion and diffusion. In a byte-width Latin square, each of 256 rows and 256 columns will have exactly one occurrence of each byte value 0 . . . 255. Before operation, the needed Latin square (or squares) are constructed under the control of one or more cryptographic keys. Each operation in this example might well use the same keyed Latin square.

We can directly compare FIG. 4 to FIG. 1, if we consider a confusion layer and diffusion layer in FIG. 1 as a single layer in FIG. 4. In both cases, we first have one confusion and diffusion to the right, and two to the left. We are then left with a single confusion layer at the bottom of FIG. 1, and a different sort of isolation layer in FIG. 4.

An external data block is conducted into the cipher on block-wide data path 152 and eight bits of that block are conducted by byte-wide data path 154 to byte-wide Latin square combining operation 156. Latin square 156 combines the value on data path 154 with the value on byte-wide data path 155 and produces a result value on byte-wide data path 158. Data path 155 carries right-going diffusion from the left-adjacent column; in the leftmost column, this is byte value IV0 (Initial Value 0) from outside the cipher. Data path 158 continues the right-going diffusion to the right-adjacent column; in the rightmost column this is reported out of the cipher as byte value C0 (carry 0). Data path 158 also conducts its value to Latin square combining operation 160. Latin square 160 combines the value on data path 158 with the value on byte-wide data path 159 and produces a result value on byte-wide data path 162. Data path 159 carries left-going diffusion from the right-adjacent column; in the rightmost column this would be byte value IV1 from outside the cipher. Data path 162 continues the left-going diffusion to the left-adjacent column; in the leftmost column this is reported out of the cipher as byte value C1. Data path 162 also carries its value to byte-wide Latin square combining operation 164. Latin square 164 combines the value on data path 162 with the value on byte-wide data path 163 and places a result value on byte-wide data path 166. Data path 163 carries left-going diffusion from the right-adjacent column; in the rightmost column this would be byte value IV2 from outside the square. Data path 166 continues the left-going diffusion to the left-adjacent column; in the leftmost column this is reported out of the cipher as byte value C2. Data path 166 also carries its value to byte-wide Latin square combining operation 168. Latin square 168 combines the value on data path 166 with the value on byte-wide data path 167 and places a result value on byte-wide data path 170. Data path 167 carries an isolation value from the left-adjacent column; in the leftmost column this is byte value IV3 from outside the cipher. Data path 166 provides isolation to the right-adjacent column; in the rightmost column this would be reported out of the cipher as byte value C3. Data path 170 is collected with the result values from the other Latin squares in the same layer as Latin square 168 into block-wide data path 172. Data path 172 then conducts the result out of the cipher for external use.

OPERATION

Before operation, all the various substitution tables to be used are initialized and shuffled under the control of a key, and any initial Values will also be selected. In general, each table will be a unique ordering of the same values.

When substitution operations are indicated, the particular table used at each position could be fixed at design time, or selected dynamically, during operation, from among many such tables.

In all cases, deciphering is performed by very similar constructions which process data from the bottom to the top. In most cases, the diagram for deciphering is exactly the same as that for enciphering, with all downward data paths replaced by upward data paths.

Normally, with exclusive-OR or Latin square diffusion, the direction of diffusion does not change when deciphering. However, when Balanced Block Mixers are used, for each mixer, both outputs become inputs, and both inputs become outputs, meaning that the diffusion direction is also reversed.

When deciphering, each substitution table is replaced by its inverse, and each Latin square is replaced by its appropriate inverse. If the Balanced Block Mixers are keyed, each of those will be replaced by its inverse; like exclusive-OR, the usual Balanced Block Mixer is its own inverse.

FIG. 1—Simple Exclusive-OR Diffusion

In operation, an external 80-bit block to be enciphered is applied to block-wide data path 12, and external byte values (probably developed from a key) are applied to IV0, IV1, and IV2. The cipher then splits the data block into ten element-wide values for processing in separate columns.

The first layer is a variable size confusion layer which includes substitution 16. The ten substitution operations in the first layer do not share data, and so can be processed simultaneously, if desired.

The second layer is a variable size diffusion layer which includes exclusive-OR 20. Here, the ten exclusive-OR operations, starting at IV0 and ending at output C0, do share data for diffusion. This implies a left-to-right ordered sequence of operations.

The third layer is another confusion layer, and includes byte-wide substitution operation 24. This layer functions just like the previous confusion layer.

To understand the purpose of the top three layers, it is useful to consider the operation in the case of two different input blocks: first, some random block, and second, the same block with only the leftmost bit changed. The different or changed bit produces a different value on data path 14, which produces a different code from substitution 16. At least one bit will change on byte-wide data path 18, and will be propagated across the full width of the block through the diffusion layer which includes exclusive-OR 20. This will change the value into each of the substitutions in the confusion layer which includes substitution 24, thus changing the result from each substitution. In this way, a change in any one input bit affects the column which includes that bit, and also each column to the right. The top three layers might be computed in one sequential pass.

The next diffusion layer, which includes exclusive-OR 28, operates like the previous diffusion layer, but in the opposite direction. This means that we cannot do all of the operations in one column before doing some of the operations in other columns. That is, the diffusion carry from adjacent columns generally constrains the processing to occur by layer (or groups of layers), instead of by column.

The next confusion layer, which includes substitution 32, operates like the previous confusion layer. The next diffusion layer, which includes exclusive-OR 36, operates like the previous diffusion layer. And the next confusion layer, which includes byte-wide substitution operation 40, operates like the previous confusion layer. The bottom four layers, which include two diffusions, but in only one direction, might be computed in a second sequential pass.

The resulting values from each column of the last layer are simply collected as the output.

To decipher the block, note that each layer is separately invertible. We simply produce the inverse tables of those used for enciphering, and process the block "up," from OUT to IN in FIG. 1. That is, a data-flow diagram for deciphering is exactly the same as FIG. 1 with only the down-arrows changed to up-arrows.

The direction of diffusion in each diffusion layer remains unchanged.

This technology supports the ciphering of blocks of various size, including huge blocks. Moreover, the total computational effort required is on the order of four table look-ups per byte ciphered. This is probably an order of magnitude less computation than that required by DES.

FIG. 2—Diffusion Across Layers

FIG. 2 is essentially the same as FIG. 1, with improved diffusion. It is found by experiment that diffusion improves when a diffusion layer includes substitution operations between exclusive-OR's. To avoid additional operations or components, the diffusion path is taken from the result of the next confusion layer. In particular, exclusive-OR 61, in the same layer as exclusive-OR 60, uses the result from substitution 64 which is fed by exclusive-OR 60.

The layer including exclusive-OR 68 is a conventional left-diffusion layer. But the layer including exclusive-OR 76 takes its diffusion inputs from the layer including exclusive-OR 68. This construction is thought to improve the strength of the cipher, by limiting the ability to isolate a single table.

When advantageous, a general-purpose computer realization might scan the block only twice: One scan would occur from left to right for the top three layers, which diffuse to the right. The other scan would be for the bottom four layers, which diffuse to the left. But in some cases it could be more efficient to simply scan each layer in sequence.

To decipher the block, again note that each layer is separately invertible. We simply produce the inverse tables of those used for enciphering, and process the block "up," from OUT to IN in FIG. 2. That is, a data-flow diagram for deciphering is exactly the same as FIG. 2 with only the down-arrows changed to up-arrows. The direction of diffusion in each diffusion layer remains unchanged.

FIG. 3—Balanced Block Mixing For Diffusion

FIG. 3 differs from FIG. 1 in its diffusion layers. The use of byte-width Balanced Block Mixing operations produces a slightly different layer structure. This provides somewhat better diffusion than FIG. 1, but also requires a little more computation.

In operation, an external 80-bit block to be enciphered is applied to block-wide data path 102. The cipher splits the data block into ten element-wide values for processing in separate columns.

The first layer is a confusion layer which includes substitution 106. The ten substitution operations in the first layer do not share data, and so can be processed simultaneously, if desired.

The second layer is a Balanced Block Mixer diffusion layer which includes mixer 110 and diffuses to the right. Here, the nine Balanced Block Mixers interleave the confusion columns. A mixer operates between each pair of adjacent confusion columns. The mixers do share data, which implies a left-to-right ordered sequence of operations.

The next five layers alternate byte-width confusion and Balanced Block Mixer layers which diffuse to the left. Again, it may be reasonable to do the top three layers in one pass, and the bottom four layers in another pass, where this is more efficient than layer-by-layer scans.

The resulting values from each column of the last layer are simply collected as the output.

To decipher the block, note that each layer is separately invertible. We simply produce the inverse confusion tables of those used for enciphering, and process the block "up," or from OUT to IN in FIG. 3. That is, a data-flow diagram for deciphering is the same as FIG. 3 with all arrows reversed. The Balanced Block Mixer outputs are made inputs, and the inputs outputs, and diffusion occurs in the opposite direction.

FIG. 4—Latin Square Combined Confusion And Diffusion

In FIG. 4, the exclusive use of Latin square combining provides simultaneous confusion and diffusion in each layer. Here, since each indicated operation is part of a diffusion, there is an implicit ordering of all operations corresponding to the diffusion direction in each row. For example, in a general-purpose computer realization, one might cause the machine to scan across the top row of operations from left to right. Then one might cause the machine to perform the middle two rows of operations in one or two passes from right to left. Then the machine could perform the bottom row of operations. Or, perhaps, with some additional temporary storage, the bottom three layers could be processed in a single pass to the left.

As usual, the cipher splits the block-wide data block into ten element-wide values for processing as separate, but communicating, columns. Each column is the same, so the cipher as a whole can be expanded element-by-element to arbitrary size.

The top layer of operations simultaneously confuse the input element values and diffuse to the right. The next two layers operate similarly, to the left. The bottom layer serves to isolate the result values.

To decipher the block, note that each layer is separately invertible. We simply produce the appropriate "inverse" square from that used for enciphering, and process the block "up," from OUT to IN in FIG. 4. That is, a data-flow diagram for deciphering is exactly the same as FIG. 4 with only the down-arrows changed to up-arrows. The direction of diffusion in each diffusion layer remains unchanged.

GLOSSARY

Additive Combiner

An additive combiner mechanism realizes numerical concepts similar to addition.

One example is byte addition modulo 256, which simply adds two byte values, each in the range 0 . . . 255, and produces the remainder after division by 256, again a value in the byte range of 0 . . . 255. Because subtraction is closely related to addition, byte subtraction mod 256 is also an additive combiner.

Another example is the bit-level exclusive-OR operation, which simply adds two bit values, each in the range 0 . . . 1, and produces the remainder after division by 2. Thus, exclusive-OR is also addition mod 2, and a byte-level exclusive-OR operation is a polynomial addition of mod 2 elements.

ASCII

A particular coding or correspondence between text characters and numeric values. ASCII is an acronym for American Standard Code for information Interchange.

Authentication

One of the objectives of cryptography: Assurance that a message is genuine; assurance that a message has not been modified in transit or storage.

Authenticating Block Cipher

A block cipher mechanism which inherently contains an authentication value or field.

An authenticating block cipher can be created by collecting an arbitrary authentication or key value in the data block along with the plaintext data. Of course this is only practical if there is enough room for a reasonable size key and a reasonable amount of plaintext data. But there will be plenty of room if the cipher is a variable size block cipher.

Avalanche

The observed property of a block cipher constructed in layers or "rounds" with respect to a tiny change in the input. The change of a single input bit generally produces multiple bit-changes after one round, many more bit-changes after another round, until, eventually, about half of the block will change. An analogy is drawn to an avalanche in snow, where a small initial effect can lead to a dramatic result. See overall diffusion.

Balanced Block Mixer

A process for balanced block mixing or any implementation (for example, hardware, computer software, hybrids, or the like) for performing balanced block mixing. See balanced block mixing.

Balanced Block Mixing

A mechanism as described in my pending application Ser. No. 08/380,960 titled Cipher Mechanisms with Fencing and Balanced Block Mixing filed 1995 Jan. 30. In the present application, only a two-input-port two-output-port version is considered.

A Balanced Block Mixer is a two-input-port two-output-port mechanism with various properties:

1. The mapping is one-to-one and invertible: Every possible input value (including both ports) to the mixer produces a different output value, and every possible output value is produced by a different input value;
2. Each output port is a function of all input ports;
3. Any change to any one of the input ports will produce a change to every output port;
4. Stepping any one input port through all possible values (while keeping the other inputs fixed) will step every output port through all possible values.

If the two input ports are labeled A and B, the two output ports are labeled X and Y, and we have some irreducible mod 2 polynomial p of degree appropriate to the port size, a Balanced Block Mixer is formed by the equations:

$$X = 3A + 2B \pmod{2}\pmod{p},$$

$$Y = 2A + 3B \pmod{2}\pmod{p}.$$

This particular Balanced Block Mixer is a self-inverse, and so can be used without change whether enciphering or deciphering. One possible value for p is 100011011 in binary (this is a mod 2 polynomial).

Balanced Combiner

In the context of cryptography, a combiner mixes two input values into a result value. A balanced combiner must provide a balanced relationship between each input and the result.

In the usual balanced combiner, any particular result can be produced by any value on one input, simply by selecting some appropriate value for the other input. In this way, knowledge of only the output value provides no information about either input.

The common examples of cryptographic combiner, including byte exclusive-OR (mod 2 polynomial addition), byte addition (integer addition mod 256), or other "additive" combining, are perfectly balanced. Unfortunately, these simple combiners are also very weak, being inherently linear and without internal state.

In contrast, there do exist nonlinear combiners with internal state, for example Latin Square combiners. See Latin square combiners.

Bit

The smallest possible unit of information. A Boolean value: True or False; Yes or No; one or zero. All information to be communicated or stored digitally is coded in some way which fundamentally relies on individual bits. Alphabetic characters are often stored in eight bits, which is a byte.

Block

A block (or data block) is some amount of data treated as a single unit. For example, the US Data Encryption Standard (DES) block cipher uses a 64-bit block: it ciphers 64 bits (typically eight ASCII characters) at once. It is not normally possible to block cipher just a single bit or a single byte of a block.

An arbitrary stream of data can always be partitioned into one or more fixed-size blocks, but it is likely that at least one block will not be completely filled. Using fixed-size blocks generally means that the associated system must support data expansion in enciphering, if only by one block. Handling even minimal data expansion may be difficult in some systems. (It may be possible to use a stream cipher on the last partial block, but if the stream cipher were truly satisfactory, we would have no need for the block cipher in the first place.)

Block Cipher

A block cipher is a mechanism which emulates a Simple Substitution of a size which is far too large to realize.

Like a Simple Substitution, a block cipher mechanism can transform a plaintext block into a ciphertext block under control of a key. (Simple Substitution is keyed by shuffling the contents of the substitution table.) A similar or related cipher mechanism can transform a ciphertext block back into plaintext when given the same key.

In an ideal block cipher, changing even a single bit of the input block must change all bits of the ciphertext result with probability 0.5. This means that about half of the bits in the output will change for any different input block, even for differences of just one bit. This is overall diffusion and is present in a block cipher, but not in a stream cipher.

A block cipher must treat all of the data in the block in ways which lead to statistically similar results. Since a block cipher must be built up from smaller components, a major part of the design concerns how every input bit can be effectively and reversibly mixed with every other input bit.

A block cipher differs from a cryptographic hash function, which is not reversible, and so does not, by itself, support deciphering.

Block Size

The amount of data in a block. For example, the size of the DES block is 64 bits or 8 bytes or 8 octets.

Byte

A collection of eight bits. Also called an "octet." A byte can represent 256 different values or symbols. The common 7-bit ASCII codes used to represent characters in computer use are generally stored in a byte; that is, one byte per character.

Cipher

A secrecy mechanism which operates on individual characters or bits independent of semantic content. As opposed to a secret code, which generally operates on words, phrases or sentences, each of which may carry some amount of complete meaning.

Ciphering

The general term which includes both enciphering and deciphering.

Ciphertext

The result of enciphering. Ciphertext will contain the same information as the original plaintext, but hide the original information, typically under the control of a key. Without the key it should be impractical to recover the original information from the ciphertext.

Code

Symbols or values which stand in place of other symbols or values.

Classically, a numeric value might represent a whole word or phrase so as to decrease the cost of telegraph messages. In modern usage, a code is a correspondence between information (such as character symbols) and values (such as the ASCII code). Coding is a very basic part of modern computation and generally implies no secrecy or information hiding. Some codes are "secret codes," however, and then the transformation between the information and the coding is kept secret.

Combiner

In a cryptographic context, a combiner is a mechanism which mixes two data sources into a single result.

A combiner is often used to encipher data, so it is normally necessary that the process be reversible to decipher data. That is, given the result and one of the input values, it is usually necessary that the other input value can be constructed by some related extractor mechanism.

Confusion

Those parts of a cipher mechanism which change the correspondence between input values and output values. In contrast, diffusion propagates changes in one part of a block to other parts of the block.

Confusion Layer

A confusion layer acts to change the value (or values) of the data. When the confusion layer is composed of substitution elements, typically each byte of the local input block is translated through a substitution table.

Confusion layers act to hide and protect the weak diffusion layers, and also to expand the bit-changes propagated by the diffusion layers.

Cryptanalysis

That aspect of cryptology which concerns the strength analysis of a cryptographic system, and the penetration or "breaking" of a cryptographic system.

Cryptographic Mechanism

A process for enciphering and/or deciphering, or an implementation (for example, hardware, computer software, hybrid, or the like) for performing that process.

Cryptography

That aspect of cryptology which is the art and science of secret messages. Cryptography includes secrecy and authentication.

Modern cryptography generally depends upon translating a message into one of an astronomical number of different intermediate representations, as selected by a key. If all possible intermediate representations have similar appearance, it may be necessary to try all possible keys to find the one which deciphers the message. By creating mechanisms with an astronomical number of keys, we can make this approach impractical.

Cryptology

The field of study which generally includes both cryptography and cryptanalysis.

Decipher

The inverse of enciphering. The process which can, if given the proper key, reveal the information or plaintext hidden in ciphertext.

Decryption

The general term for extracting information which was hidden by encryption.

DES

The particular block cipher which is the U.S. Data Encryption Standard. A 64-bit block cipher with a 56-bit key organized as 16 rounds of operations.

Diffusion

Diffusion is the property of an operation such that changing one bit (or byte) of the input will change adjacent or near-by bits (or bytes) after the operation.

Perhaps the best diffusing component is substitution, but this diffuses only within the particular element substituted. Substitution-permutation ciphers move the bits of each substituted element to other elements and substitute again, and do this repeatedly.

Most block cipher designs have fixed, non-expandable diffusion components, and so are effectively limited by these components to a particular data block size.

Also see Overall Diffusion.

Dynamic Keying

That aspect of a cipher which allows a key to be changed with minimal overhead. A dynamically-keyed block cipher might impose little or no additional computation to change a key on a block-by-block basis. The dynamic aspect of keying could be just one of multiple keying mechanisms in the same cipher.

One way to have a dynamic key in a block cipher is to include that key in the block along with the plaintext data. This is normally practical only with blocks of huge size, or variable size blocks.

Another way to have a dynamic key in a block cipher is to add a confusion layer which mixes the key value with the block. For example, exclusive-OR could be used to mix a 64-bit key with a 64-bit data block. This same layer could be made a variable size layer by using some part of the key (some byte) depending on the element position in the data block.

Diffusion Layer

A diffusion layer acts to mix a block. In a variable size block cipher design, diffusion frequently occurs only in one direction in a particular layer, thus implying that multiple diffusion layers would generally be required in a practical cipher.

Diffusion layers are intended to propagate information from one processing position to another. This means that the first such element may require an input value which is not produced by a previous processing position. Moreover, the last element will produce an output "carry" to a position which does not exist. Nevertheless, the carry serves to indicate the extendible nature of a variable size layer.

It is convenient to call the first input value to each diffusion layer an initial value or IV, and the use of some sort of IV is common in block cipher designs. In the variable size block designs of this application, it is usual to require an IV for each confusion layer. The IV inputs can be used to provide two to four bytes of inherent dynamic keying.

Dynamic Substitution Combiner

The combining mechanism described in U.S. Pat. No. 4,979,832 titled Dynamic Substitution Combiners and Extractors issued Dec. 25, 1990.

Dynamic Substitution is the use of substitution as a combiner, in which the arrangement of the table changes dynamically, under the control of one of the combiner inputs, during operation.

In the usual case, a Simple Substitution table is created and the arrangement of the table shuffled under the control of a key. One combiner input value is used to select a value from within that table to be the combined result. The other combiner input value is used simply to select an entry, and then the values at the two selected entries are exchanged.

Element

In the context of a variable size block cipher, an element is the width of a single column or ciphering unit, often a byte.

Encipher

The process which will transform information or plaintext into one of plethora of intermediate forms or ciphertext, as selected by a key.

Encryption

The general term for hiding information through secret code or cipher.

Extractor

In a cryptographic context, an extractor is a mechanism which produces the inverse effect of a combiner. This allows data to be enciphered in a combiner, and then deciphered in an extractor. Sometimes an extractor is exactly the same as the combiner, as is the case for exclusive-OR.

Fencing Layer

A fencing layer is a variable size block cipher layer composed of small (and therefore realizable) substitutions.

Typically the layer contains many separate keyed substitution tables. To make the layer extendible, either the substitutions can be re-used in some order, or in some predetermined sequence, or the table to be used at each position selected by some computed value.

Intermediate Block

In the context of a layered block cipher, the data values produced by one layer then used by the next.

In some realizations, an intermediate block might be wired connections between layer hardware. In the context of a general purpose computer, an intermediate block might represent the movement of data between operations, or perhaps transient storage in the original block.

Key

The general concept of protecting things with a "lock," thus making those things available only if one has the correct "key."

In cryptography we have various kinds of keys, including a User Key (the key which a user actually remembers), which may be the same as an Alias Key (the key for an alias file which relates correspondent names with their individual keys). We may also have an Individual Key (the key actually used for a particular correspondent); a Message Key (normally a random value which differs for each and every message); a Running Key (the confusion sequence in a stream cipher, normally produced by a random number generator); and perhaps other forms of key as well.

In general, the value of a cryptographic key is used to initialize the state of a cryptographic mechanism.

Keyed Substitution

Two substitution tables of the same size with the same values can differ only in the ordering of the values in the table. But we can key a substitution table by selecting or creating a particular ordering from the key. This is easily accomplished by shuffling the table under the control of a random number generator which is initialized from a key.

Latin Square

A Latin square is a well-known mathematical construct which is a two-dimensional array or matrix of symbols, such that each row and each column contains each symbol exactly once. Consider a Latin square of order 4, which can be represented as a 4×4 matrix with four symbols. It turns out that there are exactly 576 such squares, one of which is: ((2,0,1,3), (1,3,0,2), (0,2,3,1), (3,1,2,0)).

Latin Square Combiner

A cryptographic combining mechanism in which one input selects a column and the other input selects a row in an existing Latin square; the value of the selected element is the combiner result.

A Latin square combiner is inherently balanced, because for any particular value of one input, the other input can produce any possible output value. A Latin square can be treated as an array of substitution tables, each of which are invertible, and so can be reversed for use in a suitable extractor. As usual with cryptographic combiners, if we know the output and a specific one of the inputs, we can extract the value of the other input.

For example, a tiny Latin square combiner might combine two 2-bit values each having the range zero to three (0 . . . 3). That Latin square would contain four different symbols (0, 1, 2, and 3), and thus be a square of order 4, one of which can be written as:

| 2 | 0 | 1 | 3 |
| 1 | 3 | 0 | 2 |
| 0 | 2 | 3 | 1 |
| 3 | 1 | 2 | 0. |

With this square we can combine the values 0 and 2 by selecting the top row (row 0) and the third column (column 2) and returning the value 1.

When extracting, we will know a specific one (but only one) of the two input values, and the result value. Suppose we know that row 0 was selected during combining, and that the output was 1: We can check for the value 1 in each column at row 0 and find column 2, but this involves searching through all columns. We can avoid this overhead by creating the row-inverse of the original Latin square (the inverse of each row), in the well-known way we would create the inverse of any invertible substitution. For example, in row 0 of the original square, selection 0 is the value 2, so, in the row-inverse square, selection 2 should be the value 0, and so on:

| 1 | 2 | 0 | 3 |
| 2 | 0 | 3 | 1 |
| 0 | 3 | 1 | 2 |
| 3 | 1 | 2 | 0. |

Then, knowing we are in row 0, the value 1 is used to select the second column, returning the unknown original value of 2.

A practical Latin square combiner might combine two bytes, and thus be a square of order 256, with 65,536 byte entries. In such a square, each 256-element column and each 256-element row would contain each of the values from 0 through 255 exactly once.

Latin square combining is discussed extensively in my pending application Ser. No. 08/380,960 Cipher Mechanisms with Fencing and Balanced Block Mixing filed 1995 Jan. 30.

Layer

In the context of block cipher design, a layer is particular transformation or operation applied across the full width of the block. Layers can be confusion layers (which simply change the block value), diffusion layers (which propagate changes across the block in at least one direction) or both. In some cases it is useful to do multiple operations as a single layer to avoid the need for internal temporary storage blocks.

A layer will generally contain a number of processing positions, typically corresponding to byte positions in the data block. Actual realizations may or may not use a separate processing element for each position; for example, some realizations might re-use a single processing element in each position. Other realizations might select a particular processing element for each position from among many such elements.

The input to the first layer will be an external data block; that layer will then produce a result block which can be seen as an intermediate block, to be conducted to the next layer. However, most layers will neither increase nor decrease the amount of data in the block, and will not need to access any but the previous block value. Therefore, in software realizations, most layers can simply deposit their result back into the external data block storage. In this way, there need exist no extra physical storage for the communication between each layer. The final layer may place its result into the external data block, which then becomes the output block.

In diffusion layers, it often happens that exactly the same operation can be applied at each position. This makes it easy to handle a variable size block by simply applying one operation as often as needed.

In confusion layers, if the size of the block is set at design-time, we can simply have a separate confusion element for each position in the block (typically, each will be a distinct keyed substitution table).

However, in confusion layers where the size of the block is to vary dynamically during operation, we might select one from among many different processing elements. For example, we might select a substitution table to use at each processing position on the basis of position (in the block), some current data value (such as the value of the block at that position or the previous position), both of these, or some other quantity.

It is often convenient to think of each layer as an independent entity which updates the contents of the previous data block. But some forms of diffusion layer may connect to an earlier or subsequent layer. If realized only in layers of simple operations, such designs are likely to imply a (temporary) need for additional data storage. This can often be avoided by encapsulating the communicating operations in a single more-complex layer which may contain both confusion and diffusion.

Mechanism

The logical concept of a machine, which may be realized either as a physical machine, or as a sequence of logical commands executed by a physical machine.

A mechanism can be seen as a process or an implementation for performing that process (such as electronic hardware, computer software, hybrids, or the like).

One Way Diffusion

In the context of a block cipher, a one way diffusion layer will carry any changes in the data block in a direction from one side of the block to the other, but not in the opposite direction. This is the usual situation for fast, effective diffusion layer realizations.

In the context of a variable size block cipher, one way diffusion must conduct a change in one element to all succeeding elements, no matter how large the block.

This emphasis on the effects caused by a change in the input data occurs because even a single bit change to the input block should cause about half of the bits in the resulting ciphertext block to change state. See overall diffusion.

Overall Diffusion

That property of an ideal block cipher in which a change of even a single message bit will change every ciphertext bit with probability 0.5. In practice, a good block cipher will approach this ideal. This means that about half of the output bits should change for any possible change to the input block.

Overall diffusion means that the ciphertext will appear to change at random even between related message blocks, thus hiding message relationships which might be used to attack the cipher.

Overall diffusion can be measured statistically in a realized cipher and used to differentiate between better and worse designs. It does not, by itself, define a good cipher.

Permutation

The mathematical term for an arrangement, or re-arrangement, of symbols.

The second part of substitution-permutation block ciphers: First, substitution operations diffuse information across the width of each substitutions. Next, permutation operations act to re-arrange the bits of the substituted result; this ends a single round. In subsequent rounds, further substitutions occur, and re-arrangement occurs, until the block is thoroughly mixed and overall diffusion achieved.

Plaintext

Plaintext is the original, readable message. It is convenient to think of plaintext as being actual language characters, but may be any other symbols or values (such as arbitrary computer data which need to be protected.

Polyalphabetic Combiner

A combining mechanism in which one input selects a substitution alphabet (or table), and another input selects a value from within the selected alphabet, said value becoming the combining result. Also called a table selection combiner.

Polyalphabetic combining is a poor cousin to Latin square combining, since a group of randomly-organized tables is unlikely to produce a balanced combiner. A Latin square will only include tables which achieve overall balance.

Random Number Generator

A random number generator is a standard computational tool which creates a sequence of apparently unrelated numbers which are often used in statistics and other computations.

In practice, most random number generators are computational mechanisms, and each number is directly determined from the previous state of the mechanism. Such a sequence is often called pseudo-random, to distinguish it from a sequence somehow composed of actually unrelated values.

A computational random number generator will always generate the same sequence if it is started in the same state. So if we initialize the state from a key, we can use the random number generator to shuffle a table into a particular order which we can reconstruct any time we have the same key.

Round

In the context of block cipher design, a term often associated with a Feistel block cipher such as DES. A round is the set of operations which are repeated multiple times to produce the final data. For example, DES uses 16 generally identical rounds, each of which performs a number of operations.

Secrecy

One of the objectives of cryptography: Keeping private information private.

Secret Code

A coding in which the correspondence between symbol and code value is kept secret.

Simple Substitution

Perhaps the original classical form of cipher, in which each plaintext character is enciphered as some different character. In essence, the order of the alphabet is scrambled, and the particular scrambled order (or the scrambling process which creates that particular order) is the cipher key. Normally we think of scrambling alphabetic letters, but any computer coding can be scrambled similarly.

Small, practical examples of Simple Substitution are easily realized in hardware or software. In software, we can have a table of values each of which can be indexed or selected by element number. In hardware, we can simply have addressable memory. Given an index value, we can select the element at the index location, and read or change the value of the selected element.

A substitution table will be initialized to contain exactly one occurrence of each possible symbol or character. This allows enciphering to be reversed and the ciphertext deciphered. For example, suppose we substitute a two-bit quantity, thus a value 0 . . . 3, in a particular table as follows:

2 3 1 0.

The above substitution table takes an input value to an output value by selecting a particular element. For example, an input of 0 selects 2 for output, and an input of 2 selects 1. If this is our enciphering, we can decipher with an inverse table. Since 0 is enciphered as 2, 2 must be deciphered as 0, and since 2 is enciphered as 1, 1 must be deciphered as 2, with the whole table as follows:

3 2 0 1.

Mathematically, a simple substitution is a mapping (from input to output) which is one-to-one and onto, and is therefore invertible.

Stream Cipher

In a conventional stream cipher, each element (for example, each byte) of the message is ciphered independently.

In a few stream cipher designs, the value of one message byte may change the enciphering of subsequent message bytes, but it cannot change the enciphering of previous message bytes.

In contrast, in a block cipher, changing even later bits in a block will generally change earlier bits of the enciphering. With a conventional 64-bit block this may be somewhat less interesting than finding the same property in a 1600-bit block.

Substitution Table

A linear array of values, indexed by position, which includes any value at most once. In cryptographic service, we normally use binary-power invertible tables with the same input and output range. For example, a byte-substitution table will have 256 elements, and will contain each of the values 0 . . . 255 exactly once.

Any value 0 . . . 255 into that table will select some element for output which will also be in the range 0..255.

For the same range of input and output values, two invertible substitution tables differ only in the order or permutation of the values in the table.

A substitution table of practical size can only be thought of as a very weak cipher alone. But it can be a good part of a combination producing a stronger cipher.

Table Selection Combiner

A combining mechanism in which one input selects a table or substitution alphabet, and another input selects a value from within the selected table, said value becoming the combined result. Also called a polyalphabetic combiner.

Variable Size Block Cipher

A block cipher which supports ciphering in blocks of various size. The block size may vary only in seeps of some element size (for example, a byte), but could be arbitrarily large.

Three characteristics distinguish a true variable size block cipher from designs which are imprecise about the size of block or element they support or the degree to which they support overall diffusion:

1. A variable size block cipher is indefinitely extensible and has no theoretical block size limitation;
2. A variable size block cipher can approach overall diffusion, such that each bit in the output block is a function of every bit in the input block; and
3. A true variable size block cipher does not require additional steps or layers to approach overall diffusion as the block size is expanded.

Variable Size Block Cipher Mechanism

A cryptographic mechanism which performs the role of a variable size block cipher.

Variable Size Confusing Means

A variable size block cipher layer which performs confusion. See confusion layer.

Variable Size Diffusing Means

A variable size block cipher layer which primarily performs diffusion across a block of arbitrary size, typically in one direction only. Such a layer must guarantee to conduct a change in one element to all succeeding elements, no matter how large the block.

For example, integer addition across the whole block does not do this, because a carry occurs to each next element only about half the time. That is, changes in less significant digits often do not affect more significant digits.

In contrast, an exclusive-OR chain is an example of a diffusion layer which will collect any input change, and conduct it to all succeeding elements. It is not surprising that any layer consisting of balanced cryptographic combiners, possibly intermixed with substitutions, can do this. The surprising thing is that this is a worthwhile thing to do.

Variable Size Layers

A block cipher layer which can be easily extended (in element-size steps) to arbitrary size.

Variable size layers must maintain specific properties during extension, so that a cipher using such layer need not use additional layers when larger blocks are ciphered.

Variable Size Substituting Means

A variable size block cipher layer which primarily performs confusion, typically by translating individual bytes of the block through one or more Simple Substitution tables. See confusion layer.

Variable size substituting means can support blocks of any design size by using a different substitution table for each processing position. But when the block size may vary dynamically, it is necessary to define which table will be used at each possible processing position. Perhaps the available tables would simply be used and re-used in sequence, or perhaps some mathematical function would select a particular table at pseudo-random from a group of tables.

CONCLUSION, RAMIFICATIONS AND SCOPE OF INVENTION

Although the description of my invention contains many particulars, these should not be construed as limiting the scope of the invention. Specific examples variable size block ciphers are given merely to provide illustrations of the preferred embodiments of this invention. For example, the data paths and tables in the examples can be some size other than byte-size, and the block size can be arbitrarily large and even dynamic. Layers can be added as needed, either like those already in a particular example, or from another example, or other layers using any other sort of variable size layer technology. One or more layers can be added to perform dynamic keying without expanding the block size. Layers can also be eliminated to improve speed, while perhaps lowering the quality of the cipher.

Even though the principle cryptographic use for these particular mechanisms is as ciphers, they can also be used to create one-way functions and hash operations. Consider an authentication example: First we start with a particular block value. Simply by feeding part of the block back to the input, along with some amount of new text, a new block or authentication value can be produced by ciphering. By repeatedly processing text in this way, an authentication value can be developed covering all the text so processed.

Because the mechanism can be made as wide as desired, the authentication value can be as large as desired.

The scope of the invention should be determined by the appended claims and their legal equivalents, rather than by the specific examples given.

I claim:

1. A cryptographic mechanism for block ciphering a data block of any size, said mechanism consisting of a fixed number of layers, including two one way diffusion layers.

2. The cryptographic mechanism of claim 1 wherein at least one of said one way diffusion layers includes confusion operations.

3. The cryptographic mechanism of claim 1 wherein two of said one way diffusion layers diffuse information in opposite directions.

4. The cryptographic mechanism of claim 1 wherein at least one of said one way diffusion layers uses carry information produced by an earlier one way diffusion layer.

5. The cryptographic mechanism of claim 1 wherein at least two of said one way diffusion layers include combining mechanisms selected from the group consisting of exclusive-or, addition, subtraction and additive combining.

6. The cryptographic mechanism of claim 1 wherein at least one of said one way diffusion layers includes combining mechanisms selected from the group consisting of table selection, polyalphabetic combining, latin square combining, balanced block mixing and dynamic substitution.

7. A variable size confusion layer cryptographic mechanism, including, in combination:

(a) a fixed number of substitution means for processing block elements, and (b) selection means for selecting a particular substitution means from among said fixed number of substitution means, wherein at each position in said variable size layer a substitution means is selected, whereby a data block of any number of elements may be confused.

* * * * *